Nov. 28, 1944.  R. P. CARGILLE  2,363,773
SPOT-TEST PLATE
Filed Sept. 8, 1943
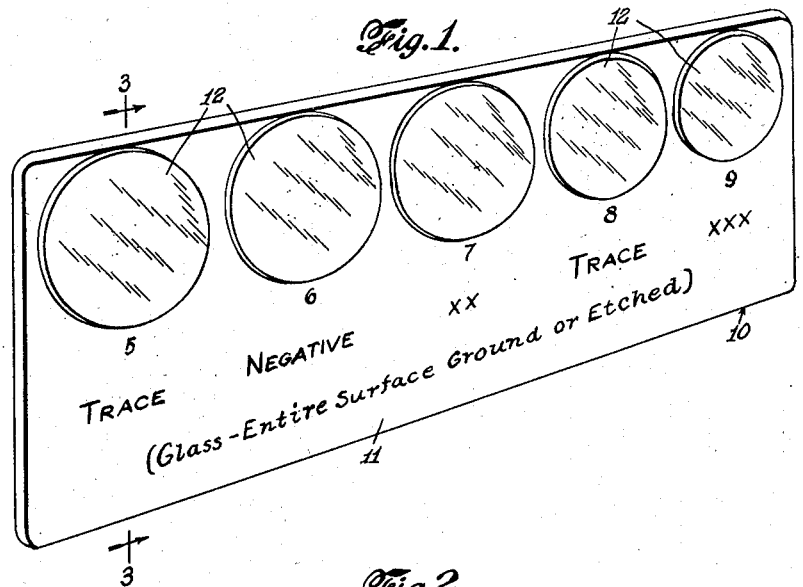
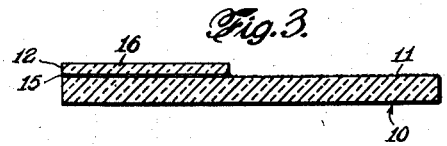
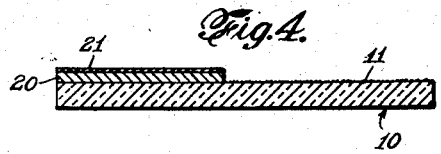
INVENTOR.
RALPH P. CARGILLE
BY
ATTORNEY.

Patented Nov. 28, 1944

2,363,773

UNITED STATES PATENT OFFICE 2,363,773

SPOT-TEST PLATE

Ralph P. Cargille, Kearny, N. J.

Application September 8, 1943, Serial No. 501,543

4 Claims. (Cl. 88—14)

The invention relates to spot-test devices, that is to say, an element such as a plate wherein a spot of a specimen solution is treated with a reagent and the percentage of the precipitate or turbidity resulting affords a measure of the particular substance for which test was made. The components thus mixed on a spot plate form a precipitate, which is observed usually, when colored, against a white background and, when white, against a dark background provided by the plate surface. It has been found that the visibility of suspended matter is enhanced if a mirror background is provided, and the present invention is concerned more especially with a spot-test device utilizing such mirrored surface background.

The invention has for an object to provide on a plate a test section or "spot" which will confine the amount of reagent to a definite predetermined volume so that quantitative as well as qualitative determinations may be effected therewith.

A further object of the invention is to provide a novel assembly of solution-retaining element with a plate element having a surface juxtaposed to the spot element whereon notations may be made for identification of solutions placed on the spot elements and of the resulting determinations.

A still further object of the invention is to provide a plate surface which will admit of readily erasing or of washing off the said notations.

The invention has for an object, also, to provide a novel assembly of spot element and plate element wherein the surface of the latter is of such a nature as to contribute to the more exact determination of the ingredient under test in that reflection of light by the surface is eliminated.

In carrying out the invention, a flat spot-test plate having a non-reflecting, washable marking surface is provided, for example, a glass plate having a ground or etched surface. This plate affords one or more mirror-finished reflecting disks which are supported upon its ground surface, the disks being of predetermined size and occupying a lesser area than the ground surface of the plate so as to afford a juxtaposed writing space upon which suitable notations may be made.

The nature of the invention, however, will best be understood when described in connection with the accompanying drawing, in which:

Fig. 1 is a perspective view of the novel spot-test plate, after completion of tests, the notations indicating the results of such tests.

Fig. 2 is a front elevation thereof.

Fig. 3 is a transverse section taken on the line 3—3, Fig. 1 of the drawings; and Fig. 4 is a similar view illustrating a modification.

Referring to the drawing, 10 designates a base element which may be of glass, plastic, composition, wood, slate, or other suitable material whose upper surface 11 is ground, etched, or otherwise roughened to afford a non-reflecting marking surface which should also be washable or capable of having pencil or crayon notations thereon readily removed or erased when the same are no longer required. On this surface is supported one or more spot-test disks 12 which are preferably of circular conformation. The area of these disks is limited not only to the extent that there remains ample marking space juxtaposed to said disks, but that they shall retain a predetermined volume of the specimen and reagent (wet or dry) which are held by surface tension thereon. Thus, a quantative as well as a qualitative determination may be made by the unit. It is preferred to arrange a plurality of these disks along one edge of the plate, for example as indicated in Fig. 1 of the drawing, thereby affording maximum marking space.

The said disks, as indicated in Figs. 1-3, are mirror-finished on the underside by providing thereon, for example, a deposit of silver 15 so that light rays striking the upper surface 16 of the disk will be reflected back through the disk and thus impinge on any precipitate deposited on said upper surface to increase the visibility of said precipitate. It is preferred, furthermore, to have these disks project above the surface of the base element 10 rather than to countersink the same therein so that full advantage may be taken of any light rays entering through the edge of a disk.

The disks are composed preferably of glass, although other transparent materials may be utilized where no reaction occurs with the specimen and/or reagent to contaminate the same. Glass also has the further advantage of being readily cleaned after use and should be relatively thin to prevent undue absorption of light which would reduce brilliancy of reflection and thus tend to destroy the sensitivity of the determination.

It is possible in instances where the specimen and/or reagent has no objectionable effect thereon, to make use of metal disks having a highly-polished, mirror-finished top reflecting surface.

Thus, as indicated in Fig. 4 of the drawing, the disk 20 is of metal, for example iron, having a nickel, chromium or like finish 21 constituting its upper surface which is designed to receive a specimen and reagent. Such surfaces, however, have a tendency to lose their brilliance and become marred, particularly through cleaning of the surfaces, and thus disks of glass are preferable for continued use.

It has been found that a device as hereinbefore described provides a supersensitive means for making the desired tests, and is compact and simple to manufacture, and that its non-reflecting surface, juxtaposed to the disks, not only enhances the determinations made on such disks, by avoiding confusion of light rays in observation, but a surface of this nature may provide a means for conveniently recording the results of the determinations. Thus, the notations shown in Fig. 1 indicate results obtained respectively with specimens 5 to 9, inclusive, treated on the corresponding disks. After the information has been duly noted, all these markings may be erased, for example by washing the surface 11; and, after cleaning the disks, the plate is ready for making determinations with additional samples.

I claim:

1. A spot-test member, comprising a plate having a flat, continuous, upper non-reflecting and washable marking surface, and a series of flat mirror-finished reflecting disks adjacently secured to said surface along an edge of the plate to afford of the latter spaces of relatively substantial areas juxtaposed to the respective disks, each disk presenting a level surface above the marking surface to receive a liquid test specimen and a reagent.

2. The spot-test member of claim 1, in which the upper surface of the plate is ground.

3. The spot-test member of claim 1, in which the exposed upper surface of the disks is mirror-finished.

4. The spot-test member of claim 1, in which the disks are of transparent material and mirror-finished on the underside.

RALPH P. CARGILLE.